(12) United States Patent
Kielwein et al.

(10) Patent No.: US 6,547,175 B2
(45) Date of Patent: Apr. 15, 2003

(54) INERTIA SENSOR, BELT RETRACTOR AND INJECTION MOLDS FOR MOLDING A SUPPORT AND A LEVER OF AN INERTIA SENSOR

(75) Inventors: Thomas Kielwein, Eschach (DE); Juergen Rink, Waldstetten (DE); Johannes Schmid, Schwaebisch Gmuend (DE)

(73) Assignee: TRW Occupant Restraint Systems GmbH & Co., KG, Alfdorf (DE)

( * ) Notice: Subject to any disclaimer, the term of this patent is extended or adjusted under 35 U.S.C. 154(b) by 107 days.

(21) Appl. No.: 09/828,513

(22) Filed: Apr. 6, 2001

(65) Prior Publication Data

US 2001/0028167 A1 Oct. 11, 2001

(30) Foreign Application Priority Data

Apr. 6, 2000 (DE) .................... 200 06 314 U

(51) Int. Cl.[7] .............................................. B60R 22/40
(52) U.S. Cl. ................. 242/384.6; 242/384.4
(58) Field of Search .................. 242/384.6, 384.4; 280/806; 297/478, 480

(56) References Cited

U.S. PATENT DOCUMENTS

| 4,050,644 A | 9/1977 | Fohl | |
|---|---|---|---|
| 4,467,981 A | * 8/1984 | Mori et al. | 242/384.4 |
| 4,978,087 A | 12/1990 | Tauber | |
| 5,622,383 A | 4/1997 | Kielwein et al. | |

FOREIGN PATENT DOCUMENTS

| DE | 2402921 | 8/1975 |
|---|---|---|
| DE | 8503541 | 4/1987 |
| DE | 4022571 | 5/1993 |
| DE | 19528387 | 4/1998 |
| EP | 0315955 | 11/1988 |

* cited by examiner

Primary Examiner—John M. Jillions
(74) Attorney, Agent, or Firm—Tarolli, Sundheim, Covell & Tummino L.L.P.

(57) ABSTRACT

An inertia sensor for vehicle-sensitive activation of a belt retractor blocking mechanism, has a mass body, a support for the mass body, and a sensor lever having a control pawl and being mounted on the support for swivelling motion about a swivel axis and resting on the mass body. The support is provided with a first circular cylindrical surface area with a axis which is parallel to the swivel axis and runs through the center of gravity of the mass body. An appendix is formed on the first circular cylindrical surface area of the support for mounting the support to the belt retractor. Further, a belt retractor with the inertia sensor and injection molds for molding the support and the sensor lever are provided.

10 Claims, 16 Drawing Sheets

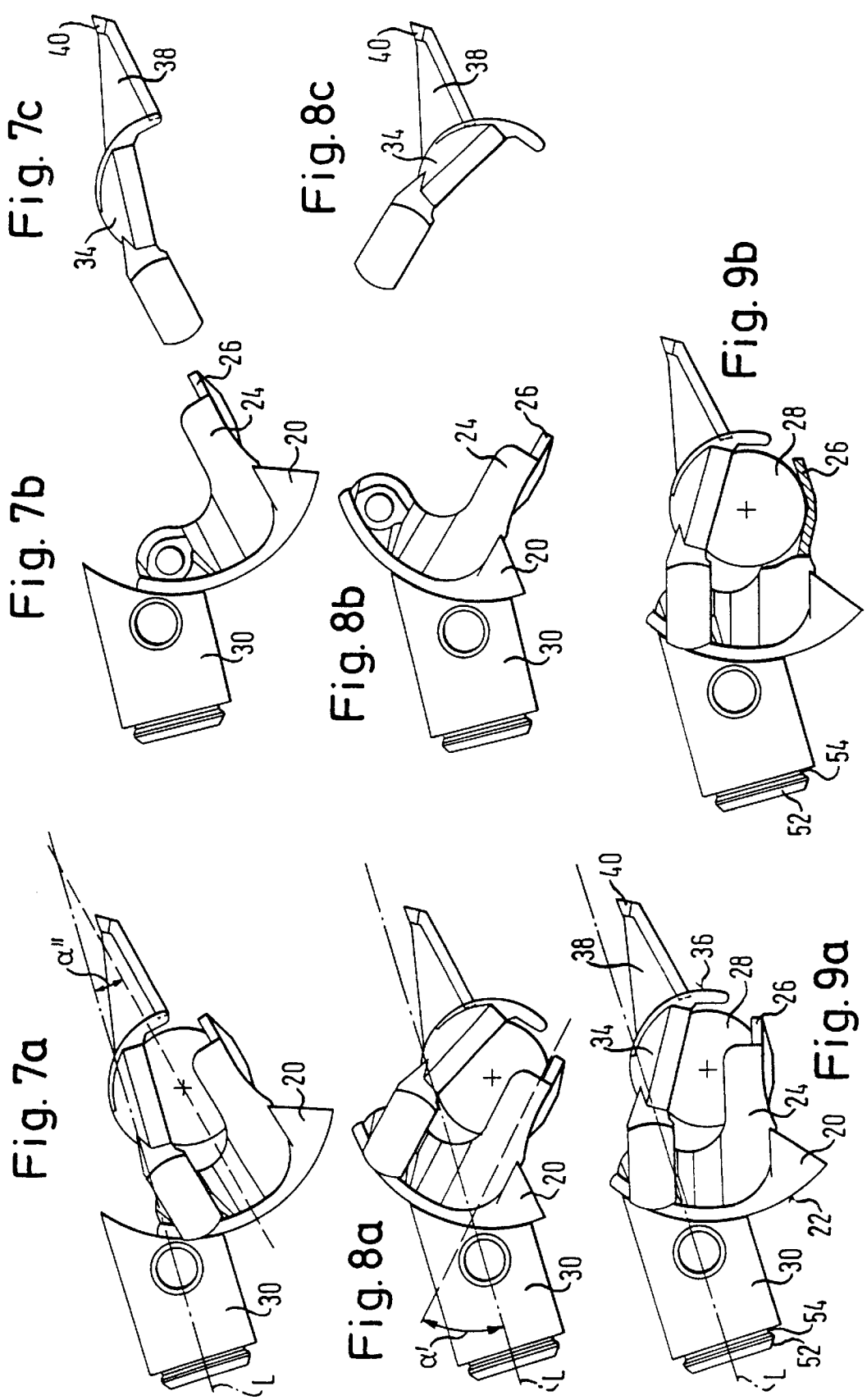

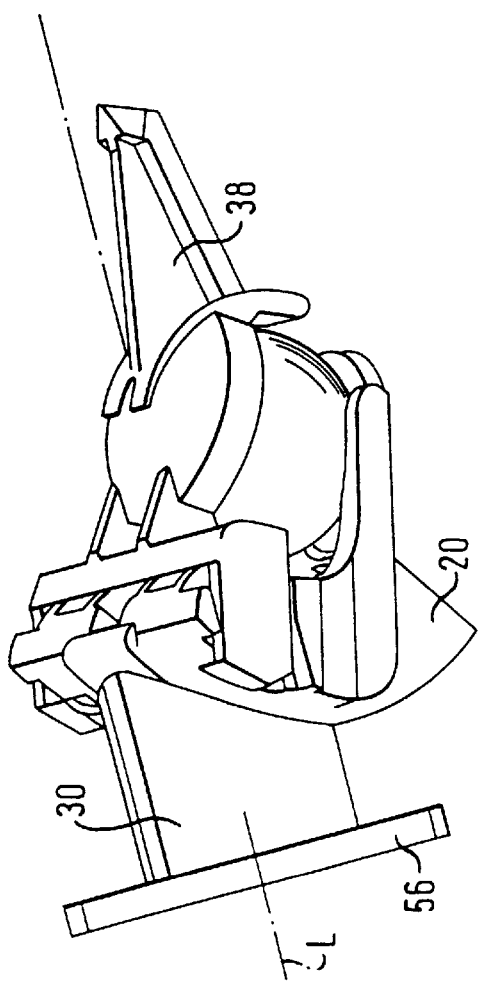
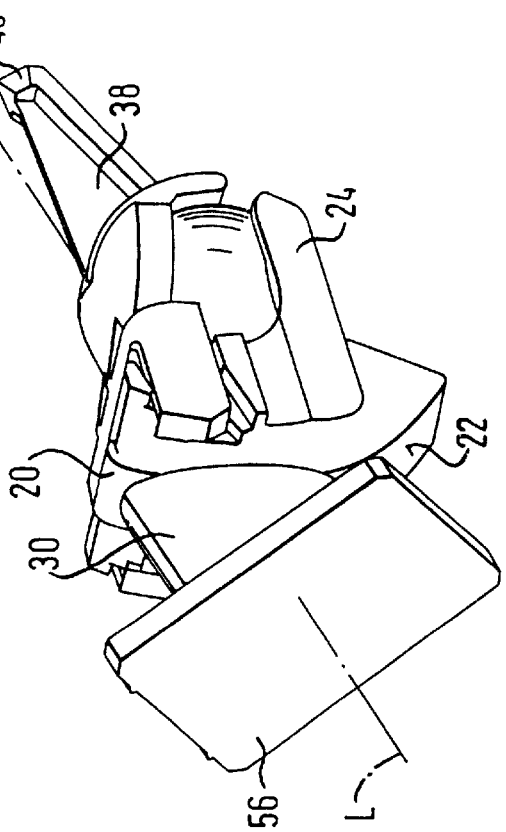
Fig. 14a
Fig. 14b

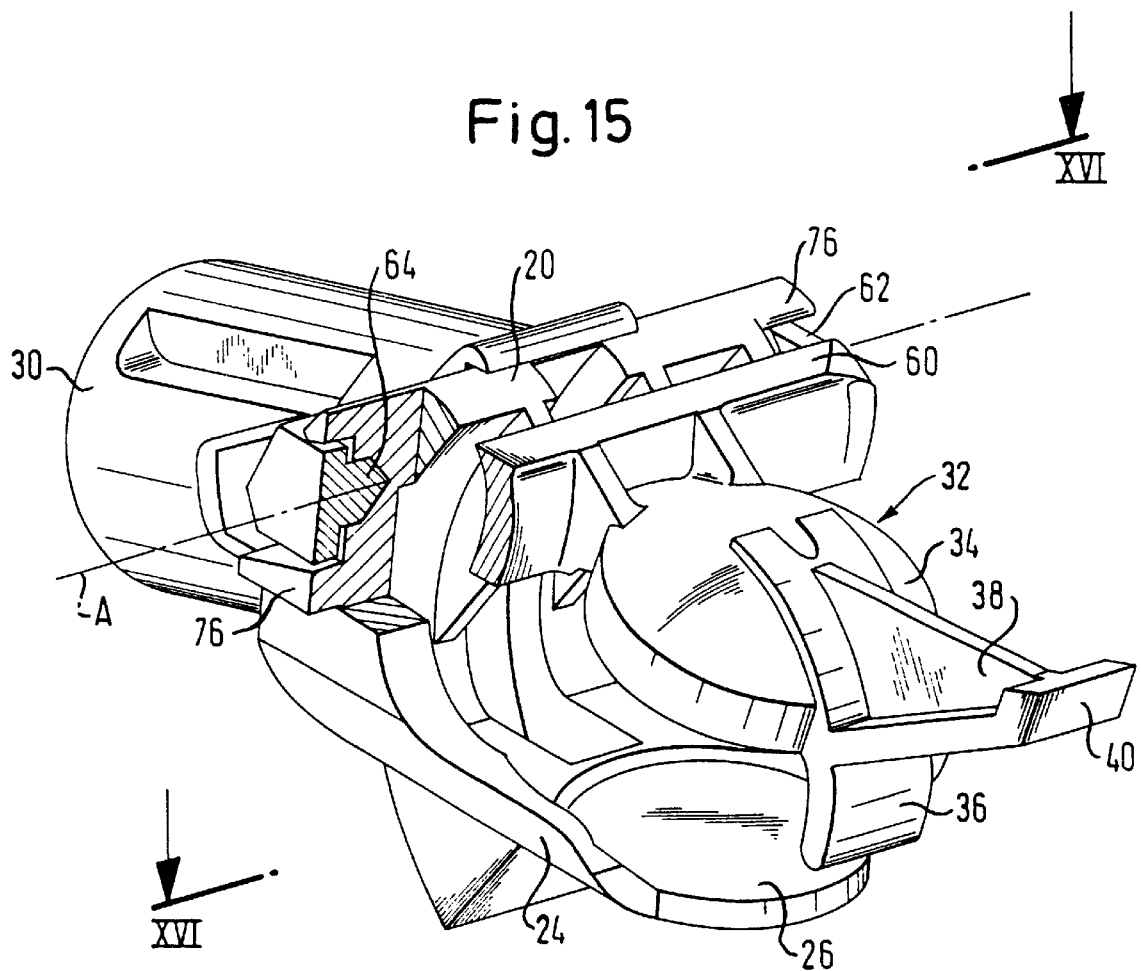

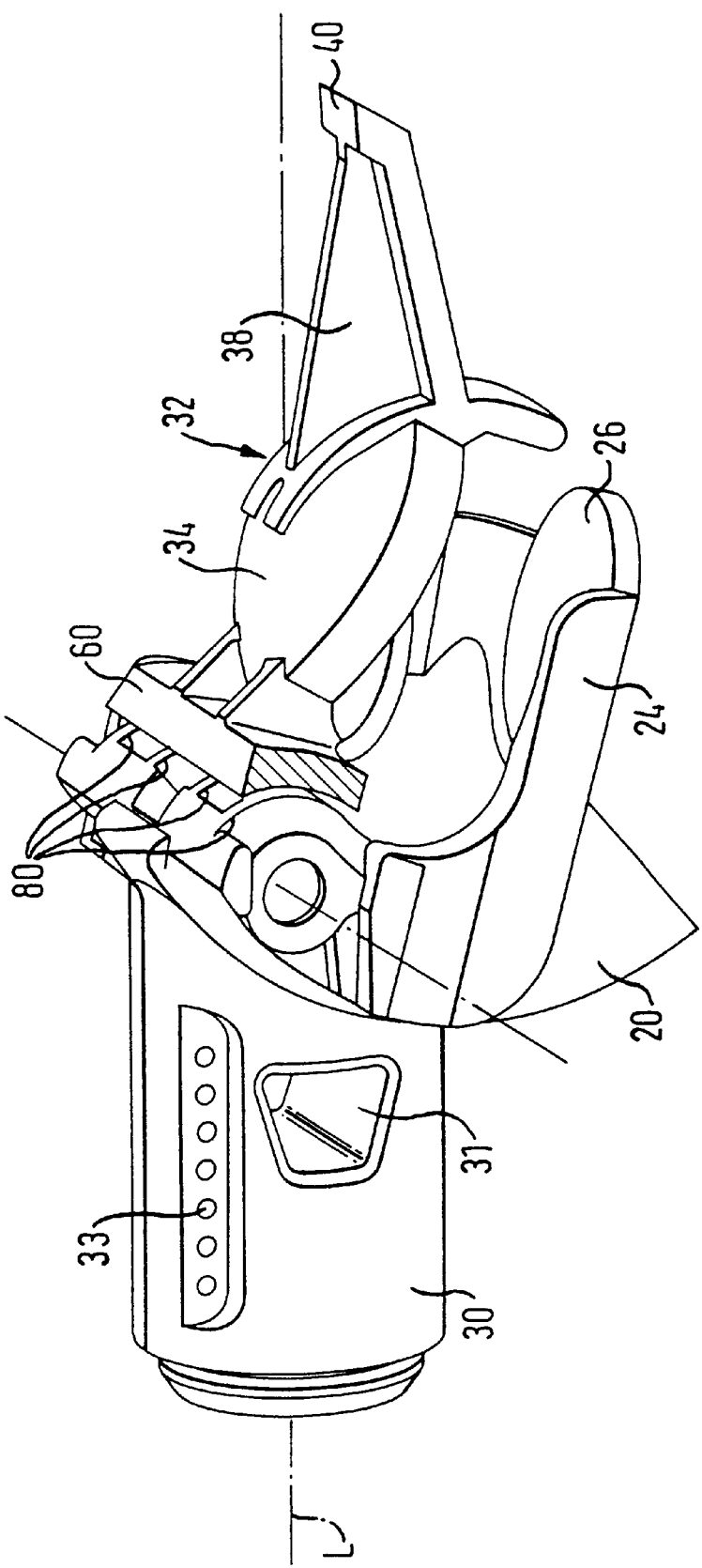

INERTIA SENSOR, BELT RETRACTOR AND INJECTION MOLDS FOR MOLDING A SUPPORT AND A LEVER OF AN INERTIA SENSOR

FIELD OF THE INVENTION

The invention relates to an inertia sensor for vehicle-sensitive activation of a belt retractor blocking mechanism. The invention relates furthermore to a belt retractor comprising a housing and one such inertia sensor as well as to an injection mold for producing a support and an injection mold for producing a sensor lever for such an inertia sensor.

BACKGROUND OF THE INVENTION

The effect of such an inertia sensor is based on the fact that a mass body which is resting on a support due to its force of gravity, is moved from its resting position when the sensor is accelerated transversely to the force of gravity due to its mass inertia to thereby dislocate the sensor lever so that the contact section of its control pawl engages, for example, the toothing of a control disc of the belt retractor, blocking any movement thereof. For a proper function of the sensor, the sensor needs to be mounted in the vehicle relative to the horizontal in a way that the mass body assumes its resting position, i.e. that the sensor lever is not dislocated when the mass body is not exposed to any further force of inertia than to the force of gravity. The inertia sensor is accommodated in the housing of the belt retractor and the mounting position of the belt retractor may differ from one vehicle to the next. This is why either the fastening arrangement of the sensor in the housing has to be changed or a changed sensor has to be provided for each vehicle type having a different mounting position of the belt retractor. This is in any case undesirable since changing in design involves considerable expense in time and money.

The invention provides an inertia sensor which is configured such that it can simply be produced for various mounting positions of one and the same housing.

BRIEF DESCRIPTION OF THE INVENTION

The inertia sensor according to the invention comprises a mass body, a support for the mass body, and a sensor lever with a control pawl. The sensor is mounted on the support for swivelling motion about a swivel axis and rests on the mass body. The control pawl has a free end defining a contact section for contact with a control disc of the belt retractor. The support is provided with a first circular cylindrical surface area, the axis of the first circular cylindrical surface area being parallel to the swivel axis and running through the center of gravity of the mass body. An appendix is formed on the first circular cylindrical surface area of the support for mounting the support to the belt retractor.

Since the assigned mounting position of the housing of the belt retractor dictates the orientation of the appendix securing the sensor in the housing, the appendix must be applied to the support under a specific angle so that the sensor can assume a position relative to the horizontal needed for proper functioning of the sensor.

In one advantageous further embodiment of the invention the sensor lever is provided with a second circular cylindrical surface area, the axis of which being parallel to the swivel axis and running through the center of gravity of the mass body, the control pawl being mounted to said second cylindrical surface area. This makes it possible to also apply the control pawl to the sensor lever at various angles so that for the sensor lever the same advantages materialize as for the support.

The invention further provides a belt retractor comprising a housing with a recess, a blocking mechanism with a control disc and an inertia sensor for vehicle-sensitive activation of the blocking mechanism. The inertia sensor comprises a mass body, a support for the mass body, and a sensor lever with a control pawl. The sensor lever is mounted on the support for swivelling motion about a swivel axis and resting on the mass body. The control pawl has a free end defining a contact section for contact with the control disc. The support is provided with a first circular cylindrical surface area. The axis of the first circular cylindrical surface area is parallel to the swivel axis and runs through the center of gravity of the mass body. An appendix is formed on the first circular cylindrical surface area of the support, the appendix having a free end on which a plate is provided. The plate is mounted non-rotatably in the recess. The retractor according to the invention provides for a simple attachment of the sensor to the retractor housing in a predetermined rotational position.

According to another aspect of the invention a belt retractor is provided which comprises a housing with a recess, a blocking mechanism with a control disc, an inertia sensor for vehicle-sensitive activation of the blocking mechanism. The inertia sensor comprises a mass body, a support for the mass body, and a sensor lever with a control pawl. The sensor lever is mounted on the support for swivelling motion about a swivel axis and rests on the mass body. The control pawl has a free end defining a contact section for contact with the control disc. The support is provided with a first circular cylindrical surface area. The axis of the first circular cylindrical surface area is parallel to the swivel axis and runs through the center of gravity of the mass body. An appendix is formed on the first circular cylindrical surface area of the support, the appendix having a longitudinal axis, being of a cylindrical shape with respect to the longitudinal axis and being mounted in the recess so as to be pivotable about the longitudinal axis.

Thus, the invention makes it possible to rotate the sensor about its longitudinal centerline after being installed in the housing so that a further degree of freedom materializes for the mounting position of the housing.

The invention further provides an injection mold for molding of a support according to the invention for supporting a mass body of an inertia sensor for vehicle sensitive activation of a blocking mechanism of a belt retractor. The inertia sensor comprises a sensor lever with a control pawl, the sensor lever being mounted on the support for swivelling motion about a swivel axis and resting on the mass body, the control pawl having a free end defining a contact section for contact with the blocking mechanism. The support is provided with a first circular cylindrical surface area having an axis parallel to the swivel axis and running through the center of gravity of the mass body. An appendix is formed on the first circular cylindrical surface area of the support for mounting the support to the belt retractor. The injection mold according to the invention comprises a first mold part for the support and an insert defining a mold for the appendix. The insert is rotatable about an axis of rotation with respect to the first mold part in such a manner that, by rotating the insert, supports with different angles between the appendix and the first circular cylindrical surface area can be injection molded. The axis of rotation coincides with the swivel axis of the support when molded in the injection mold, the insert adjoining the first mold part along a mold joint surface for forming the first circular cylindrical surface area of the support.

This support finds application in inertia sensors for belt retractors mountable in various mounting positions in the vehicle. Producing a support on which the appendix is molded at a specific angle to the support merely requires the insert to be set by rotation to the mold for the appendix without necessitating a new mold for producing this new component. In addition, considerable savings in time and money materialize from eliminating the need to refit the injection mold.

According to a further aspect, the invention teaches an injection mold for molding of the sensor lever for an inertia sensor according to the present invention for vehicle sensitive activation of a blocking mechanism for belt retractor. The inertia sensor comprises a support for supporting a mass body, the sensor lever having a control pawl with a free end defining a contact section of a contact with the blocking mechanism, the sensor lever being mounted on the support for swivelling motion about a swivel axis and resting on the mass body. The sensor lever is provided with a circular cylindrical surface area having an axis parallel to the swivel axis and running through the center of gravity of the mass body. The control pawl is mounted to the circular cylindrical surface area. The injection mold comprises a first mold part of the sensor lever and an insert defining a mold for the control pawl. The insert is rotatable about an axis of rotation with respect to the first mold part in such a manner that, by rotating the insert, sensor levers with different angles between the appendix and the circular cylindrical surface can be injection molded. The axis of rotating coincides with the swivel axis of the sensor lever when molded in the injection mold. The insert adjoins the first mold part along a mold joint surface for forming the circular cylindrical surface area of the sensor lever.

BRIEF DESCRIPTION OF THE DRAWINGS

Advantageous aspects of the invention read from the sub-claims.

FIG. 7a is a view of the inertia sensor as shown in FIG. 3;

FIG. 7b is an illustration of the support including the appendix of the inertia sensor as shown in 7a;

FIG. 7c is an illustration of the sensor lever of the inertia sensor as shown in FIG. 7a;

FIG. 8a is a view of the inertia sensor as shown in FIG. 2;

FIG. 8b is an illustration of the support including the appendix of the inertia sensor as shown in FIG. 8a;

FIG. 8c is an illustration of the sensor lever of the inertia sensor as shown in FIG. 8a;

FIG. 9a is a view of the inertia sensor as shown in FIG. 1a;

FIG. 9b is a partly sectioned view of the inertia sensor as shown in FIG. 9a;

FIG. 10 is a first partial view in perspective of the housing of the belt retractor as shown in FIG. 1a;

FIG. 11 is a second partial view in perspective of the housing of the belt retractor as shown in FIG. 1a;

FIG. 14a is a first view in perspective of the inertia sensor as shown in FIG. 13;

FIG. 14b is a second view in perspective of the inertia sensor as shown in FIG. 13;

FIG. 15 is a partially sectioned first view in perspective of the inertia sensor as shown in FIG. 1a;

FIG. 18 is a partially sectioned second view in perspective of the inertia sensor as shown in FIG. 15;

DETAILED DESCRIPTION OF THE INVENTION

Figure 1A:
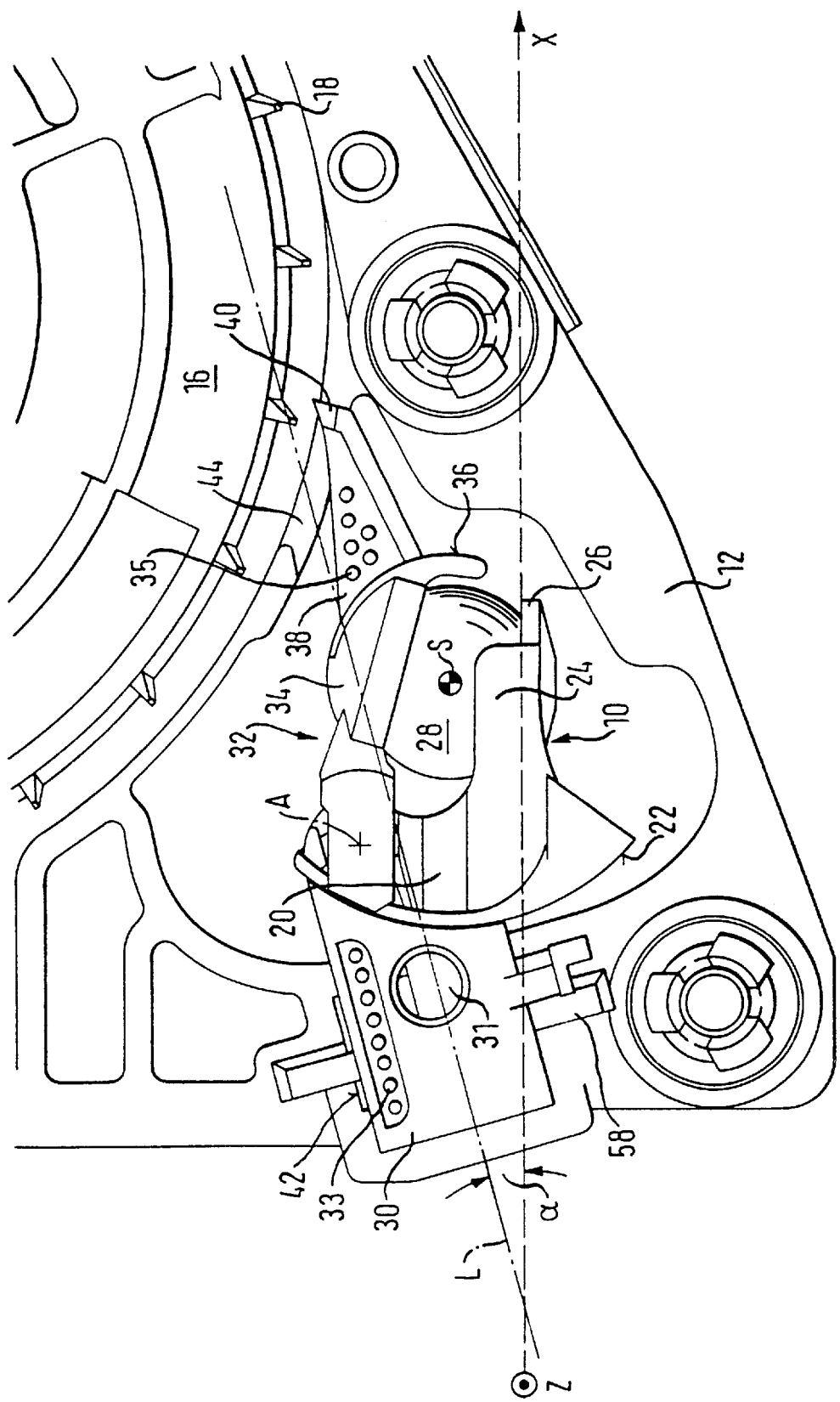
FIG. 1a is a view of a belt retractor incorporating a first embodiment of the inertia sensor in accordance with the invention.
Figure 1B:
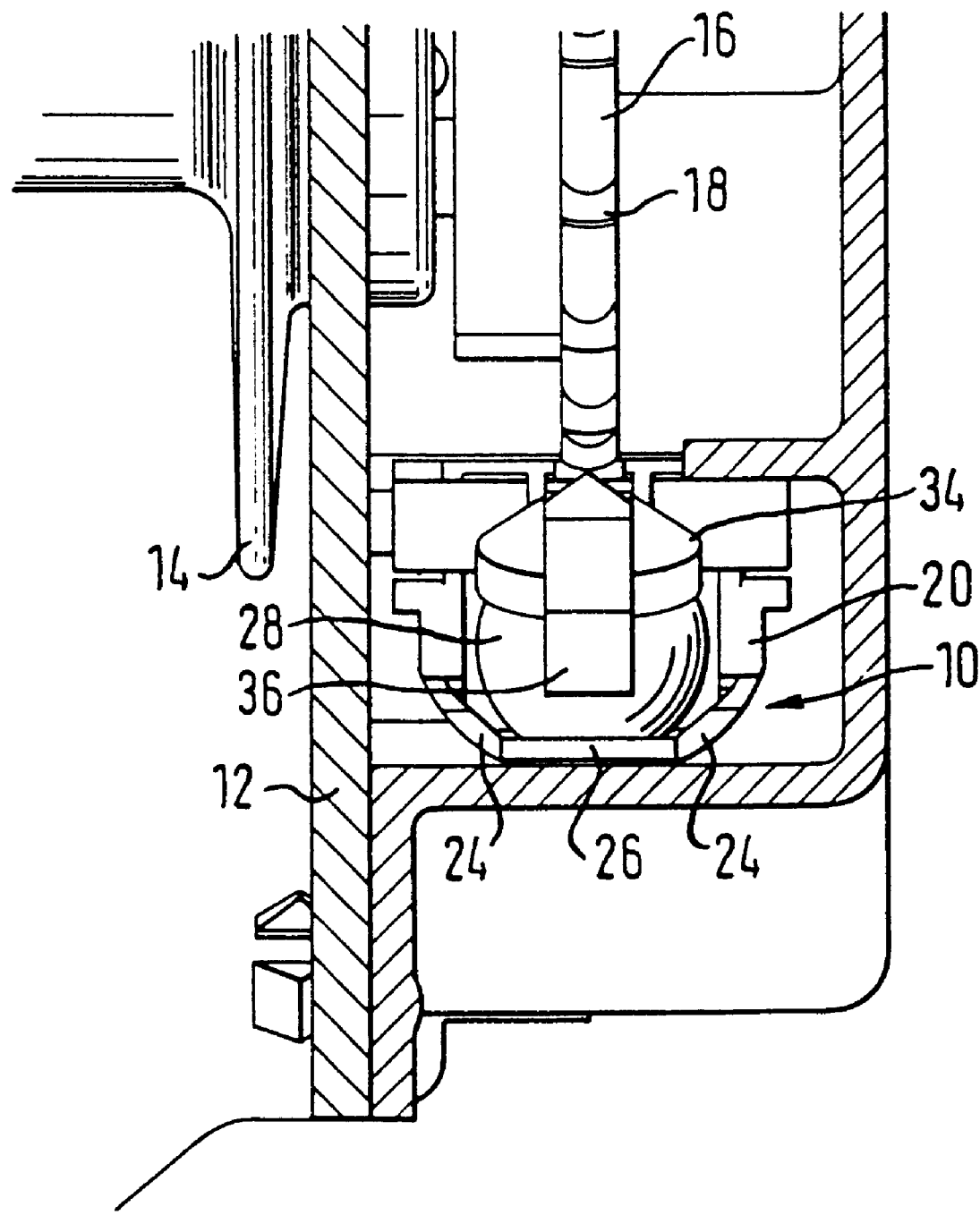
FIG. 1b is a view of the belt retractor as shown in FIG. 1a with the housing sectioned.
Figure 2:
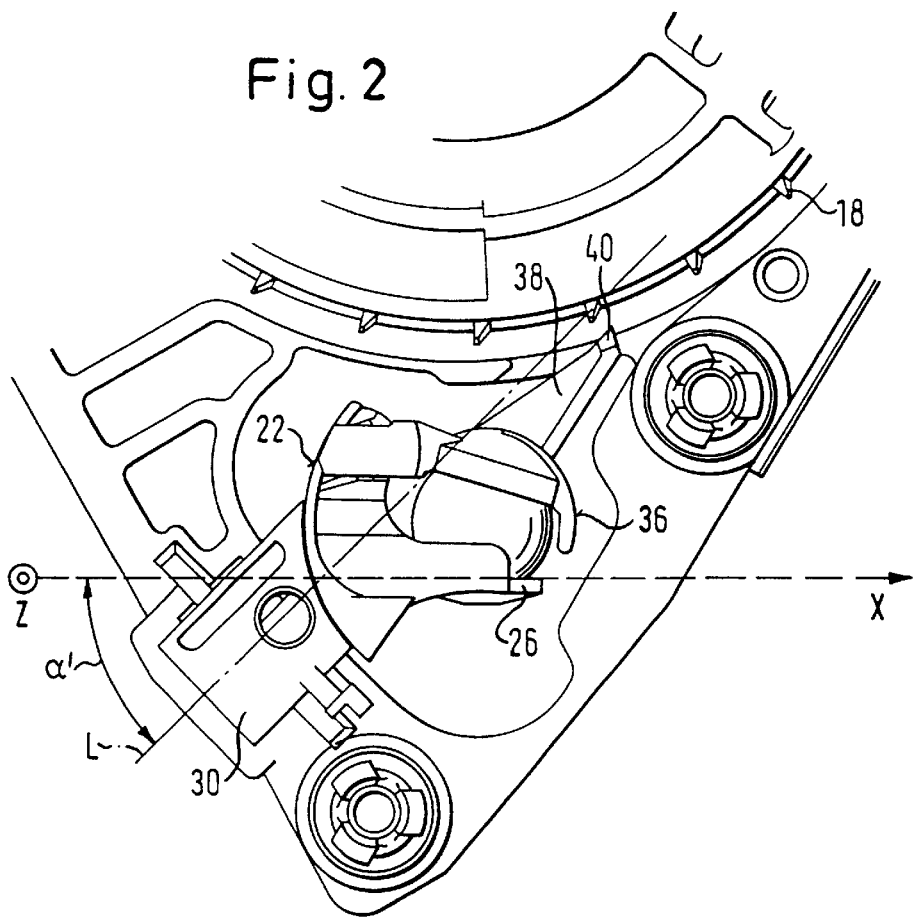
FIG. 2 is a view of belt retractor including an inertia sensor in accordance with a second embodiment of the invention.
Figure 3:
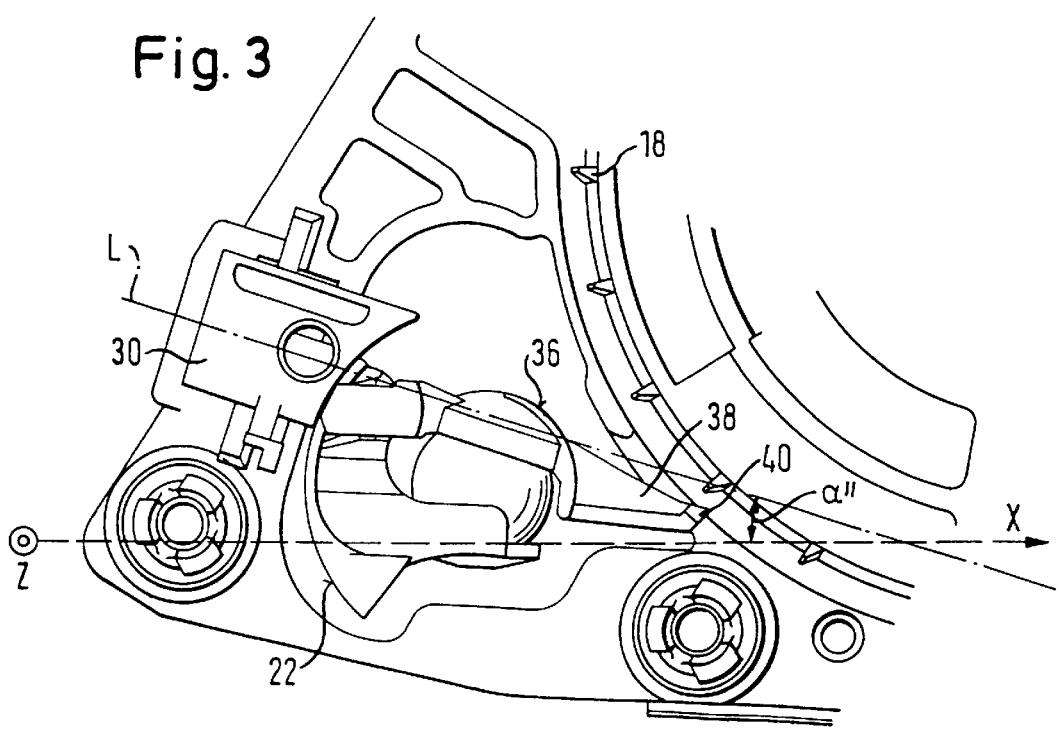
FIG. 3 is a view of belt retractor including an inertia sensor in accordance with a third embodiment of the invention.
Figure 4B:
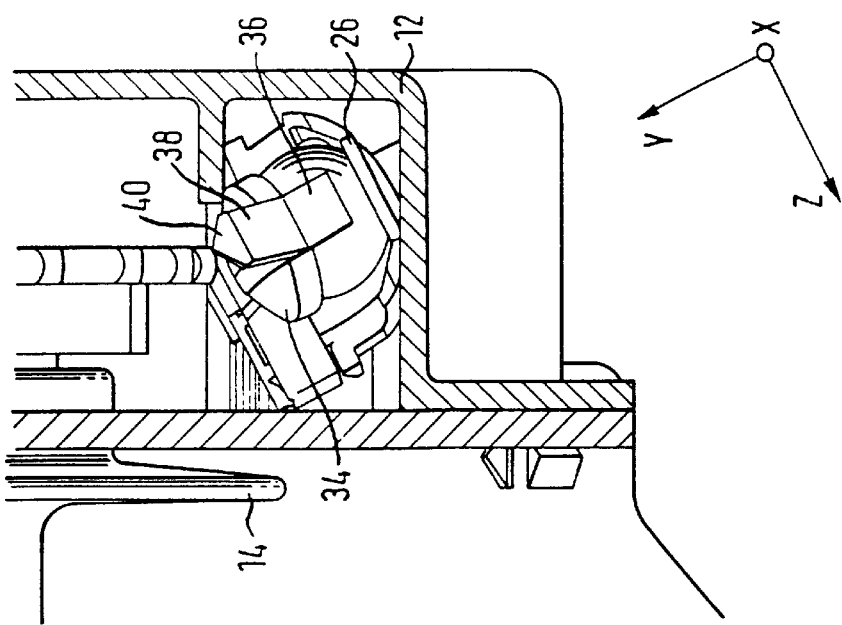
FIG. 4b is a view of the belt retractor as shown in FIG. 4a with the housing sectioned.
Figure 4A:
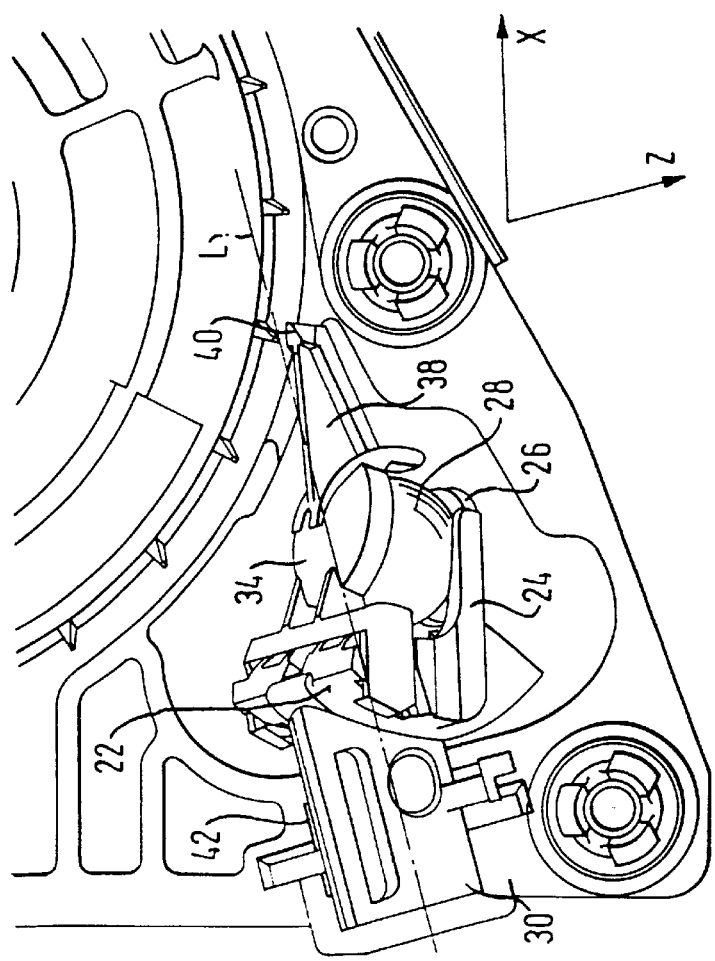
FIG. 4a is an illustration of the belt retractor as shown in FIG. 1a but in a second condition.
Figure 5:
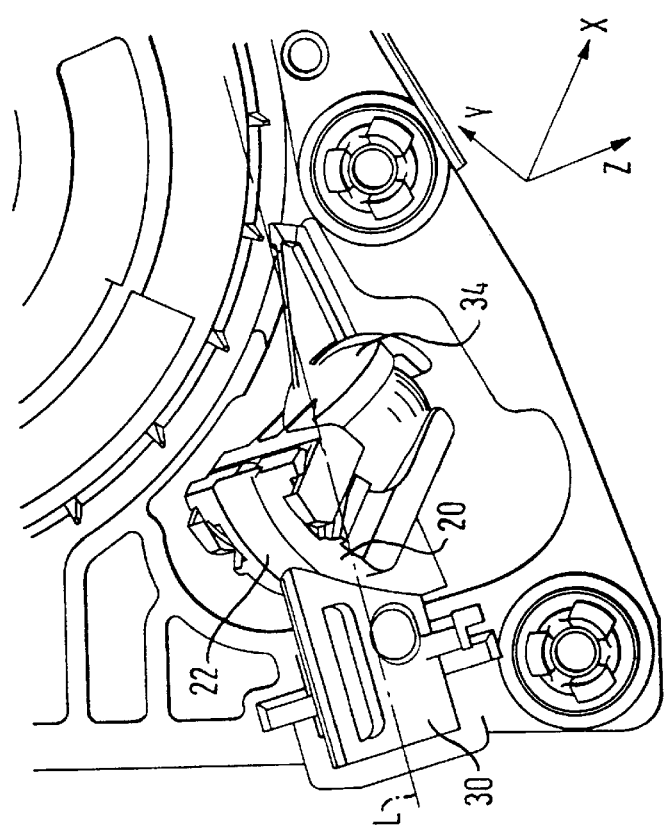
FIG. 5 is an illustration of the belt retractor as shown in FIG. 3 but in a second condition.
Figure 6:
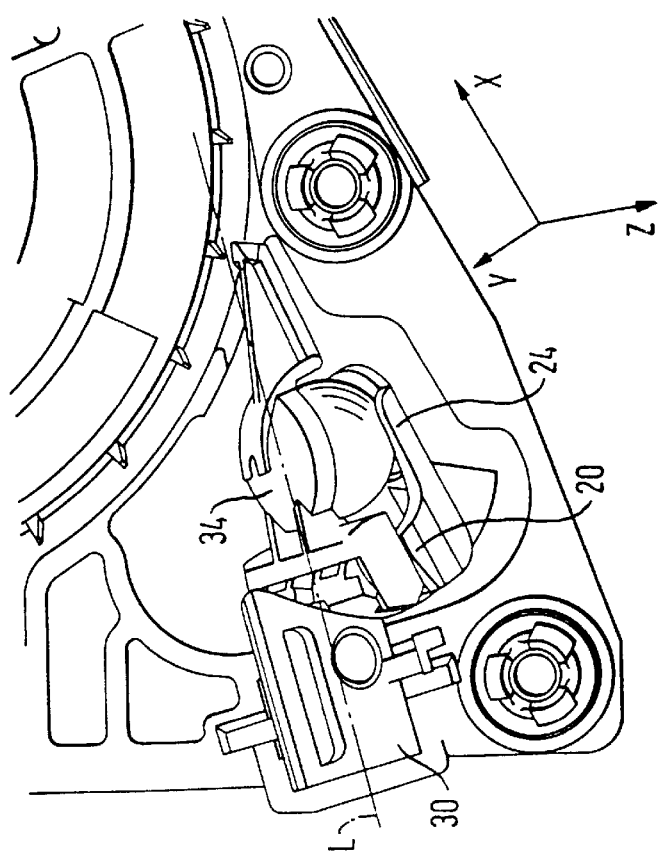
FIG. 6 is an illustration of the belt retractor as shown in FIG. 2 but in a second condition.

Referring now to the FIGS. 1a and 1b there is illustrated part of a belt retractor equipped with an inertia sensor 10. The belt retractor consists of a housing 12, a belt reel 14 and a blocking mechanism including a control disc 16, the housing 12 being illustrated opened in FIG. 1a and sectioned in FIG. 1b to render the inertia sensor 10 visible which is usually totally enclosed to prevent dirt ingress. The blocking mechanism with the control disc 16 may be actuated by known ways and means vehicle- and belt sensitive and is thus not detailed in the following. For vehicle-sensitive activation of the blocking mechanism the control disc 16, provided with teeth 18 needs to be blocked relative to the housing, this being the purpose of the inertia sensor 10 in the present embodiment.

The inertia sensor 10 (see also FIG. 9a) consists of a support 20 supporting by means of two arms 24 a mount 26 for a mass body in the form of a ball 28. The support 20 comprises a first circular cylindrical surface area 22 describing a circular arc of somewhat more than 90° about the center point of the ball 28. The mount 26 consists of a plate, the inner side of which is preferably conically dished (FIG. 9b) resulting in the ball contacting the plate only on a circular line to facilitate its movement. Applied to the first cylindrical surface area 22 is an appendix 30 of circular cross-section, the longitudinal axis L of which (indicated in FIG. 1a by the dot-dashed line) together with the X/Z plane (indicated as a solid line in FIG. 1a), which is covered by the edge of the plate-shaped mount 26, includes an angle α. (In the FIGS. 7a, 8a and 9 embodiments are shown in which the appendix 30 is applied at different angles of α', α"). The significance of this angle will be explained later. Running through the appendix 30 transversely to the longitudinal axis L is a hole 31 serving to facilitate handling the inertia sensor 10, for example, in automated assemblers. The assembler is able to engage the hole 31 and thus maintain the inertia sensor 10 in a defined position. The cross-section of the hole 31 is circular, but may be of any other configuration as evident from FIG. 18. Applied to a recess in the appendix 30 is a specific number of coding marks 33 in which the angle α of this appendix 30 is coded. The configuration of the coding marks is detailed further on in describing an injection mold. The sensor lever 32 is likewise provided with coding marks 35, in this embodiment preferably on the control pawl 38, so that a sensor lever 32 having a specific angle setting can be assigned to the corresponding support 20.

A sensor lever 32 is mounted on the support 22 for swivelling motion about an axis A parallel to the X/Z plane (indicated in the drawings by a coordinate system). The sensor lever 32 has a section configured as a domed cap 34, lying on the ball 28, the ball 28 thus supporting the sensor lever 32. Starting from the center point of the domed cap 34 a second cylindrical surface area 36 is radially extending beyond the edge of the domed cap. Applied to the cylindrical surface area 36 is a control pawl 38, the free end of which forms a contact section 40. The axis of the second cylindrical surface area 36 runs parallel to the axis A through the center of gravity of the ball. The inertia sensor 10 is almost totally surrounded by the housing 12, merely an opening 44 permitting the control pawl 38 to penetrate in the direction of the control disc 16.

The belt retractor is fitted in the vehicle so that the X/Z plane of the inertia sensor 10 is located horizontal. When the vehicle is stationary or on the move at constant speed, the force of gravity acts on the ball 28 only in the direction of the normal vector of the X/Z plane. In its resting position the ball 28 is then located at the lowest point in its dished mount 26. When the belt retractor is accelerated in the X/Z plane, for example during a braking action, the ball 28 is imparted due to its mass inertia a force by which it can be moved from its resting position, the ball 28 lifting the domed cap-shaped section 34 of the sensor lever 32, resulting in the sensor lever 32 being swiveled in its mount. In this arrangement the control pawl 38 approaches the control disc 16 so that on rotation of the control disc 16 the contact section 40 engages by one of the teeth 18 to thus block the control disc.

It is important for proper functioning of the inertia sensor 10 that the X/Z plane is always approximately horizontal in the mounted condition of the belt retractor. If the belt retractor is installed in a different position, an inertia sensor is to be used on which the appendix 30 is applied to the cylindrical surface area 22 at another angle α' relative to the X/Z plane. Referring now to FIGS. 2, 3 and 7a to 8c there are illustrated embodiments in which a very large (α' as shown in FIGS. 2, 8a–c) and a negative angle (α" as shown in FIGS. 3, 7a–c) is implemented. The possible range of this angle depends on the angle of the circular arc covered by the cylindrical surface area 22, the same applying to the angle by which the control pawl 38 is applied to the cylindrical surface area 36 of the sensor lever 32. This angle is to be selected so that the contact section 40 when engaging the teeth 18 is again located on the longitudinal axis L. The gist of the invention will readily be appreciated when considering appendix 30 and control pawl 38 as a first unit which in the various embodiments for the various mounting positions always maintain their position with respect to each other so that the contact section 40 is always located on the longitudinal axis L of the appendix 30 when the inertia sensor 10 is active. The support 20 with the mount 26 and the sensor lever 32 can then be considered as a second unit which always needs to be oriented for proper functioning of the inertia sensor 10 so that its X/Z plane is located horizontal. Since for various mounting positions of the belt retractor the longitudinal axis L of the first unit assumes different angles to the horizontal, sensors are needed for these different mounting positions in which the X/Z plane of the second unit is rotated relative to the longitudinal axis L of the first unit just by this angled α.

Figure 11:
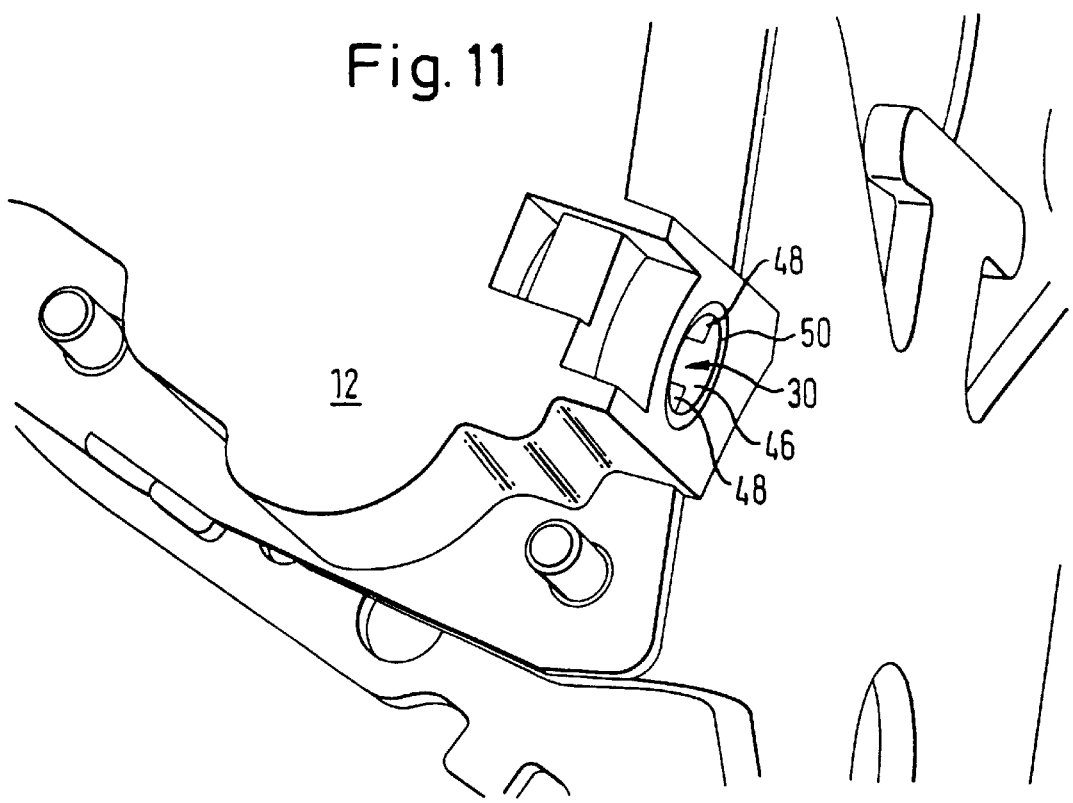
Figure 10:
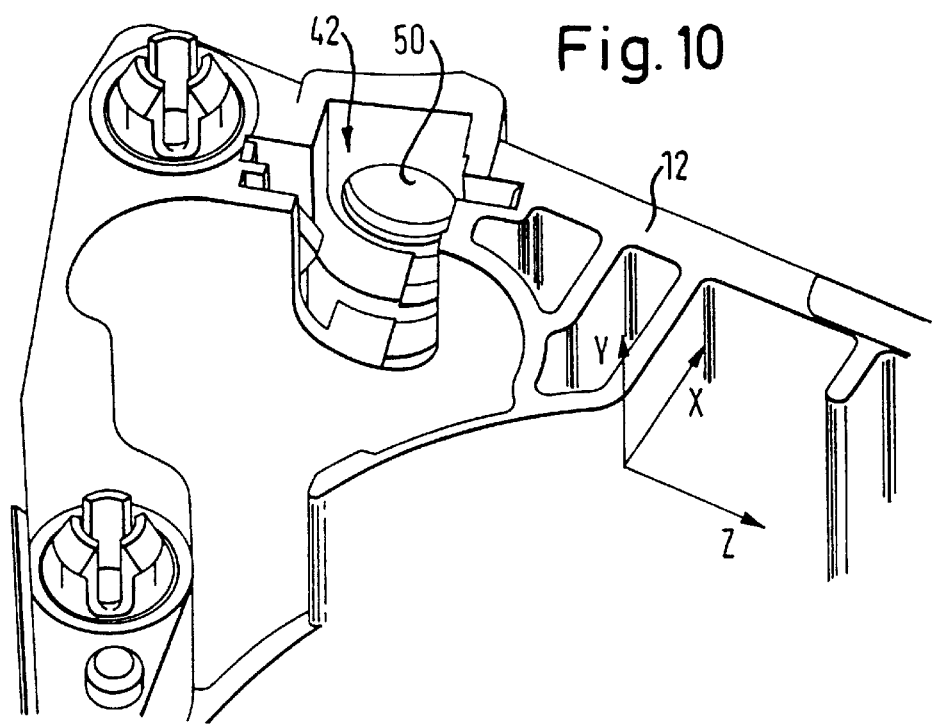
Figure 12:
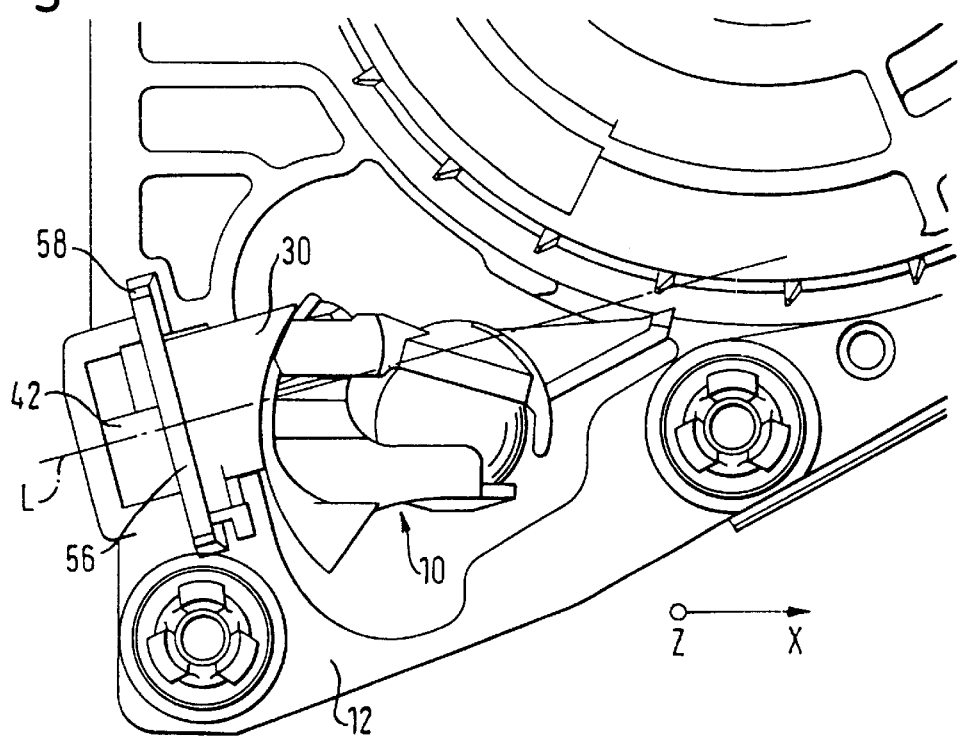
FIG. 12 is a cross-section through part of a belt retractor including an inertia sensor in accordance with a fourth embodiment of the invention.
Figure 13:
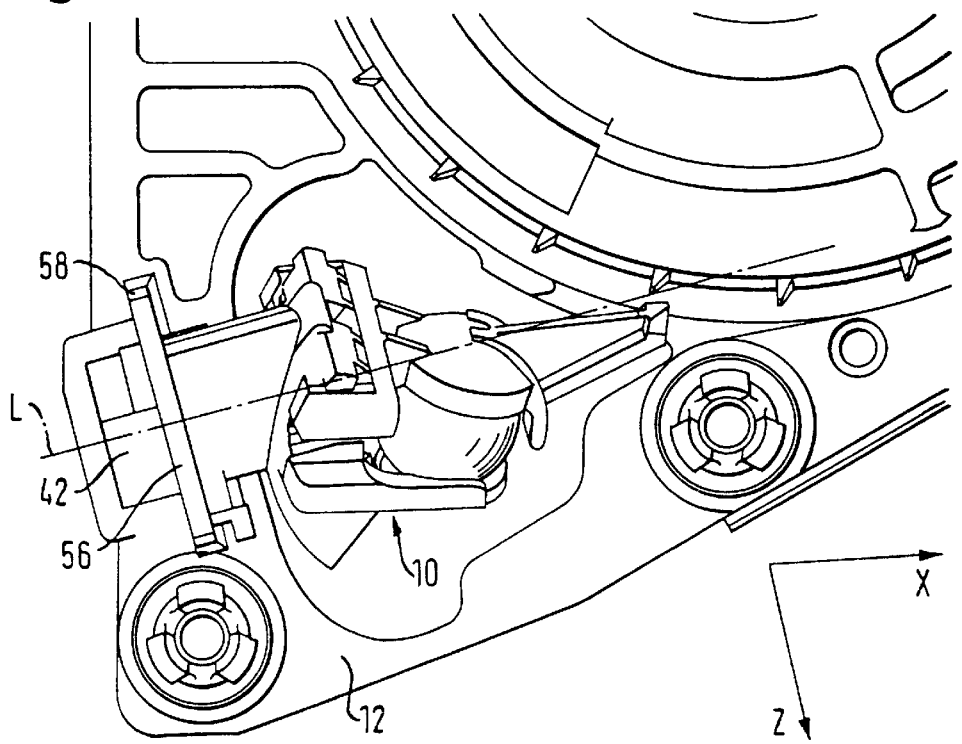
FIG. 13 is a cross-section through part of a belt retractor housing including an inertia sensor in accordance with a fifth embodiment of the invention.

Referring now to FIG. 10 there is illustrated part of an opened housing 12 without the inertia sensor 10. Evident in the region of the recess 42 is an opening 50 rendering the end of the appendix 30 accessible from without. The housing 12 is evident from without as illustrated in FIG. 11 in which it is depicted closed and an inertia sensor is fitted, of which only the end of the appendix 30 is to be seen. The diameter of the opening 50 is smaller than the diameter of the appendix 30. The end of the appendix 30 is formed by a protuberance 52 (see also FIGS. 7a–9b) having a somewhat smaller diameter than the opening and thus being able to protrude through the opening 50. This protuberance 52 provides additional guidance of the appendix 30 in the opening 50. The protuberance 52 is parted from the appendix 30 by a collar 54 in which a seal may be inserted to seal off the opening 50.

Referring now to FIGS. 4a, 4b, 5 and 6 there is illustrated how the appendix 30 is rotatably mounted about the longitudinal axis L in a recess 42 in the housing 12 so that the position of the X/Z plane can be corrected when the belt retractor needs to be fitted so that the plane of the control disc 16 is no longer located vertical. This setting may advantageously be carried out directly after fitting the inertia sensor 10 in the housing 12 when it is known in which mounting position the belt retractor needs to be fitted. Subsequently the rotational position of the appendix 30 in the recess 42 in the housing is secured by a setting means for example, by laser welding or bonding so that the position of the inertia sensor 10 can no longer change during shipment or in later operation. For making the setting a circular recess 46 is provided at the free end of the appendix 30 (FIG. 11), two opposite webs 48 radially protruding into the recess 46. This recess 46 is accessible from without through the opening 50 in the housing 12 (FIG. 11) so that the inertia sensor 10 can be rotated about the longitudinal axis L following assembly of the belt retractor.

Referring now to FIGS. 12–14b there is illustrated a more simple way of fitting the inertia sensor 10 in the housing 12 materializing by abandoning the possibility for the setting relative to the longitudinal axis L. The free end of the appendix 30 can then be provided with a rectangular plate 56 which is inserted into a recess 58 in the housing 12 resulting in the inertia sensor being mounted non-rotatably. The orientation relative to the longitudinal axis L will then already be defined in production of the support 20 by applying the plate 56 in the desired orientation about the longitudinal axis L.

To advantage the housing 12 may be designed so that it can accommodate both embodiments of the inertia sensor 10, i.e. with both a cylindrical appendix end and a rectangular plate 56, the housing 12 then including recesses 42, 58 for both embodiments as evident from the FIGS.

Figure 17:
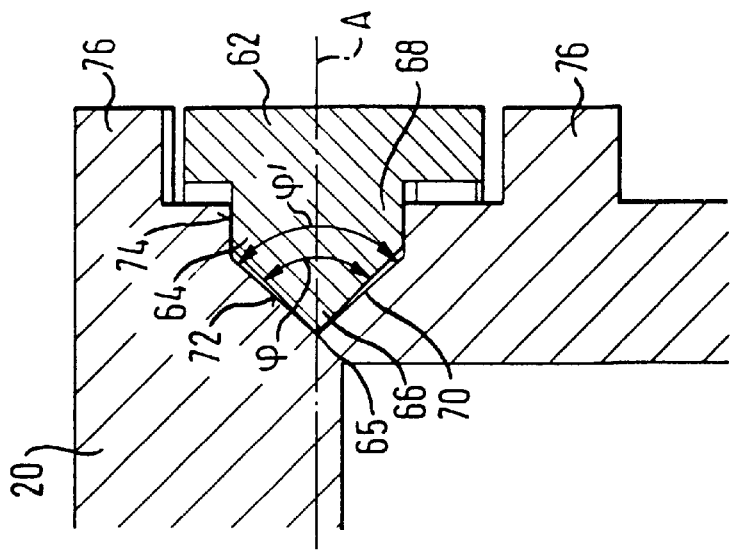
FIG. 17 is a magnified illustration of the detail XVII as shown in FIG. 16.
Figure 16:
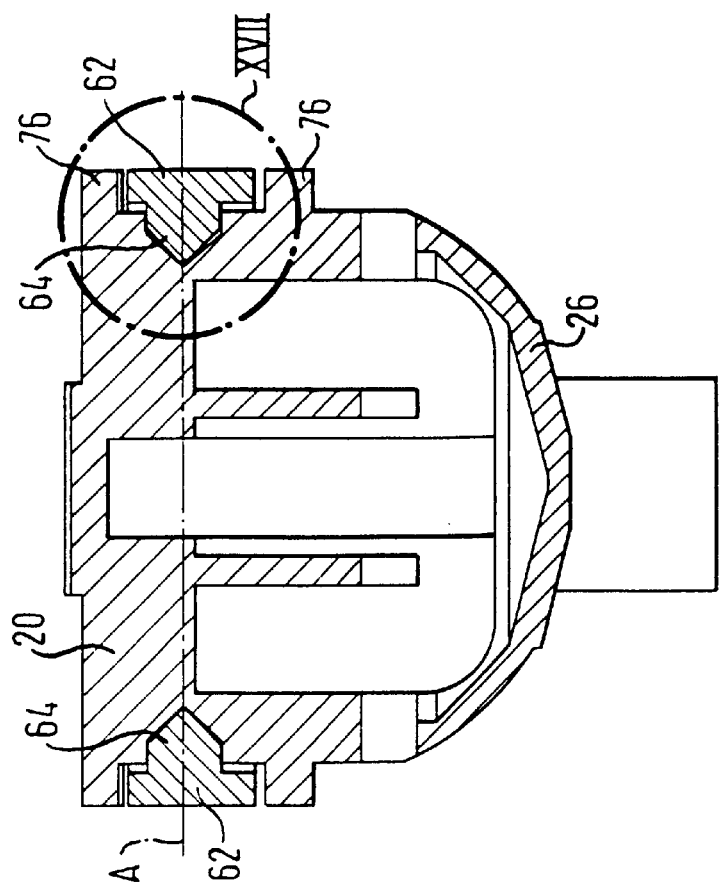
FIG. 16 is a cross-section through the inertia sensor as shown in FIG. 15 in the plane XVI.

Referring now to FIGS. 15 to 17 there is illustrated in more detail how the sensor lever 32 is mounted on the support 20. Applied to the domed cap 34 of the sensor lever 32 opposite the cylindrical surface area 36 is a web 60 at the ends of which two parallel arms 62 are provided which clasp the support 20. Provided at the sides facing each other of the arms 62 in each case is a cog 64 comprising at its tip 65 a conical section 66 and adjoining thereto a cylindrical section 68. These cogs engage holes 70 drilled in the support 20 comprising at the bottom a conical section 72 and adjoining thereto a cylindrical section 74. As evident from the detail in FIG. 17 the acute angle of the conical section 68 of the cog 64 is smaller than the acute angle of the conical section 72 of the holes 70 so that the cog is mounted substantially only at the tip 65. The cogs 64 are additionally guided by their cylindrical section 68 in the cylindrical section 74 of the holes, they will still remain in line with the holes 70 even with low machining tolerances of the tip 65. Provided on both sides of the arms 62 on the support 20 are stops 76 which define the maximum swivel range of the sensor lever 32 so that the ball 28 cannot drop out of the inertia sensor 10.

Figure 20:
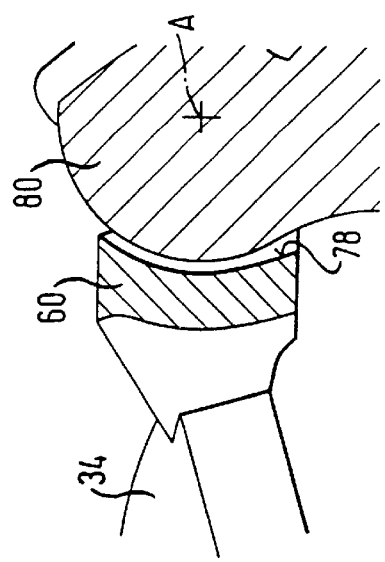
FIG. 20 is a magnified illustration of the detail XX as shown in FIG. 19.
Figure 19:
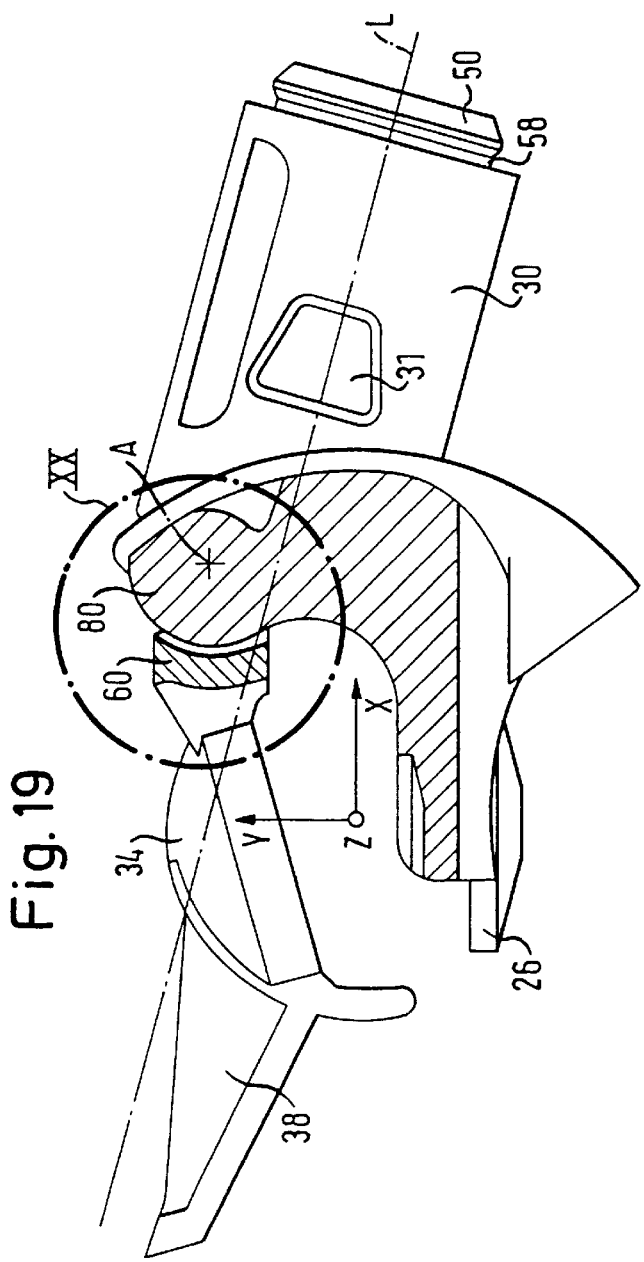
FIG. 19 is a longitudinal section through the inertia sensor as shown in FIG. 18.

Referring now to FIGS. 18 to 20 there is illustrated in more detail how the sensor lever at the web 60 comprises a cylindrical supporting surface area 78 the axis of which coincides with the swivel axis A of the sensor lever. Opposite the supporting surface area 78 the support 20 is provided with ribs 80 comprising an outer contour cylindrical to the axis A, this outer contour being slightly spaced away from the supporting surface area 78. When the contact section 40 of the control pawl 38 mates with the teeth 18 of the control disc 16, the sensor lever 32 receives a load substantially in the direction of the longitudinal axis L of the inertia sensor 10. The web 60 is flexible, so that this load need not be transferred by the tip bearing of the cog 64 (FIGS. 15–17). The web 60 thus flexes under the load transversely to its longitudinal centerline until the supporting surface area 78 comes into contact with the ribs 80, thus enabling the sensor lever 32 to pass on the load via the supporting surface area 78 to the ribs 80 of the support 20 and ultimately to the housing 12.

It will readily be appreciated that the invention is not restricted to the embodiments as shown. Other aspects are just as conceivable in which instead of the ball a mass body in some other shape may be made use of which may also be mounted in a different way. What is important is that the axes of the cylindrical surface areas of support and sensor lever are identical and pass through the center of gravity of the mass body.

Figure 21:
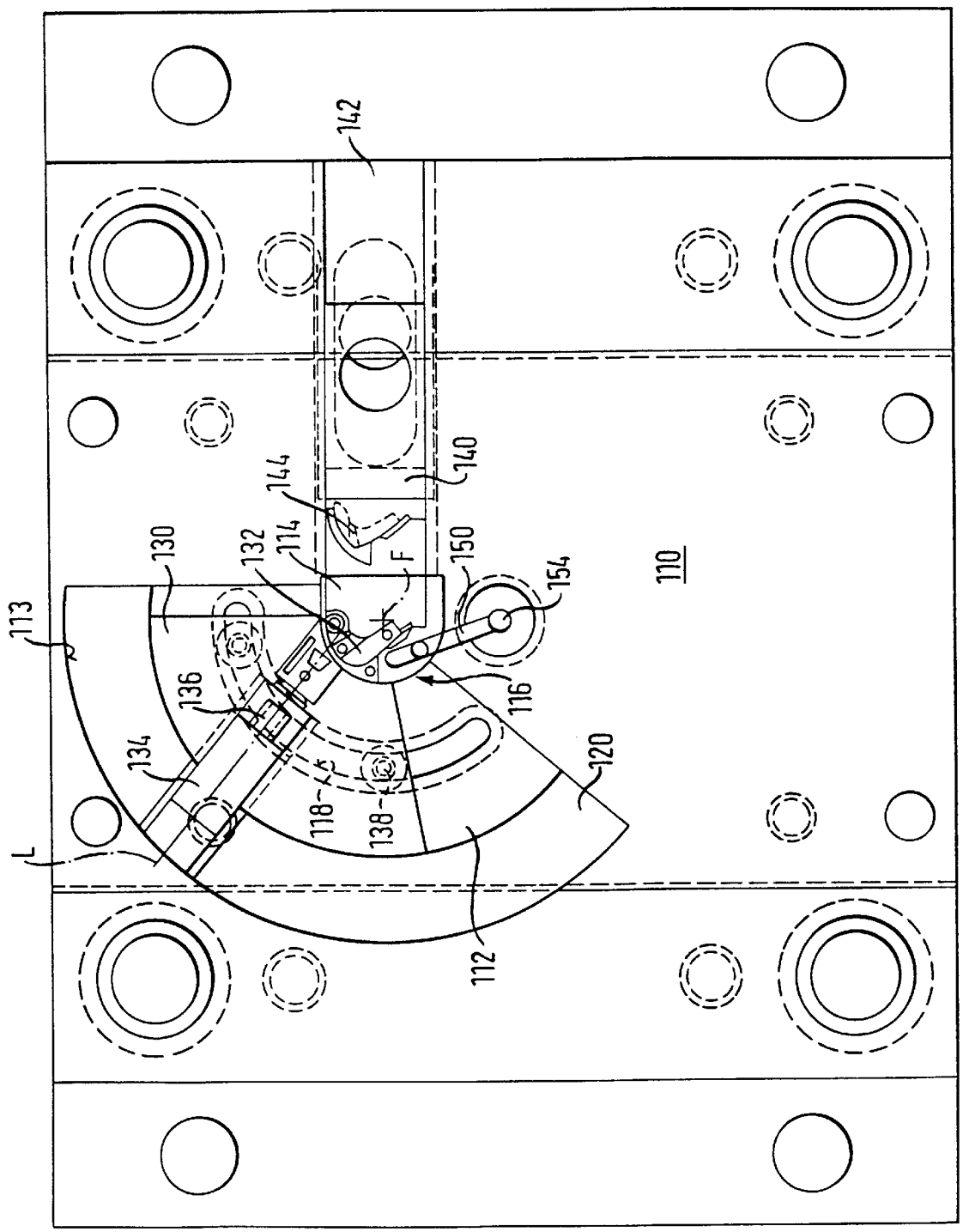
FIG. 21 is a schematic view of the lower mold half of an injection mold in accordance with the invention.

Referring now to FIG. 21 there is illustrated schematically (and only by half) an embodiment for an injection mold for producing a support for an inertia sensor in accordance with the invention with a molded appendix. only the lower half of the injection mold is illustrated, the upper half is configured respectively mirror-like for covering the lower half as is obvious to the person skilled in the art. The mold contours for the individual parts of the support are identified by reference numerals as used in the prior description, supplemented by a mark'. Illustrated is a view of the parting plane of the lower mold half 110. This lower mold half 110 consists substantially of a plate in which a recess 112 is machined. The recess 112 has in this view the shape of a circular ring segment which in the present case covers an angle of roughly 135° with an axis of rotation F running perpendicular to the parting plane of the mold. The contour of the recess 112 remote from the axis of rotation F forms a cylindrical surface area 113.

In the direction of the axis of rotation F the recess 112 is defined by a support mold insert 114 inserted as a first mold part in the lower mold half 110 and forming the lower part of a mold contour 20' for the support. The support mold insert 114 is defined in the direction of the recess 112 by a cylindrical mold joint surface 116, the axis of which coincides with the axis F.

At the bottom of the recess 112 a longitudinal slot 118 is configured on a circular arc about the axis F, this longitudinal slot extending through the lower mold half 110 of the injection mold. The bottom of the recess 112 is stepped, the step adjoining the cylindrical surface area 113 forming a ridge 120 in the shape of a ring segment. Slidingly guided between the support mold insert 114 and the ridge. 120 is an appendix mold insert 130 substantially consisting of a circular ring segment, the axis of which again coincides with the axis F. Configured at the surface of the insert 130 located in the parting plane of the injection mold is the molding contour 30' for the appendix, the longitudinal axis L of which is located perpendicular to the axis of rotation F in the mold parting plane.

Provided in the longitudinal axis L at the end adjoining the molding contour 30' in the insert 130 is a recess in which a first displacer 134 is slidingly guided in the direction of the longitudinal axis L. At its face surface area facing the molding contour 30' the first displacer 134 comprises a mold contour 136 with which the recess 46' can be molded in the appendix of the support to be molded together with the webs 48'. Configured at the underside of the appendix mold insert 130 by which it contacts the bottom of the recess 112 are two pins 138 protruding through the longitudinal slot 118 and with which the appendix mold insert 130 can be secured to the lower mold half 110.

A second displacer 140 is slidingly guided in a passage 142 extending from the support mold insert 114 up to the edge of the mold joint surface area 116. At the face side of the second displacer 140 facing the support mold insert 114 a mold contour 144 is configured for the inertia sensor of the support 20'. Feed passages 150, 152 connect the mold for the support to the feed bore 154 via which the injection mold is supplied with the material to be injected. In addition, several securing and centering holes are provided in the lower mold half 110, the functions of which is known to the person skilled in the art and thus are not detailed in the following.

Figure 22:
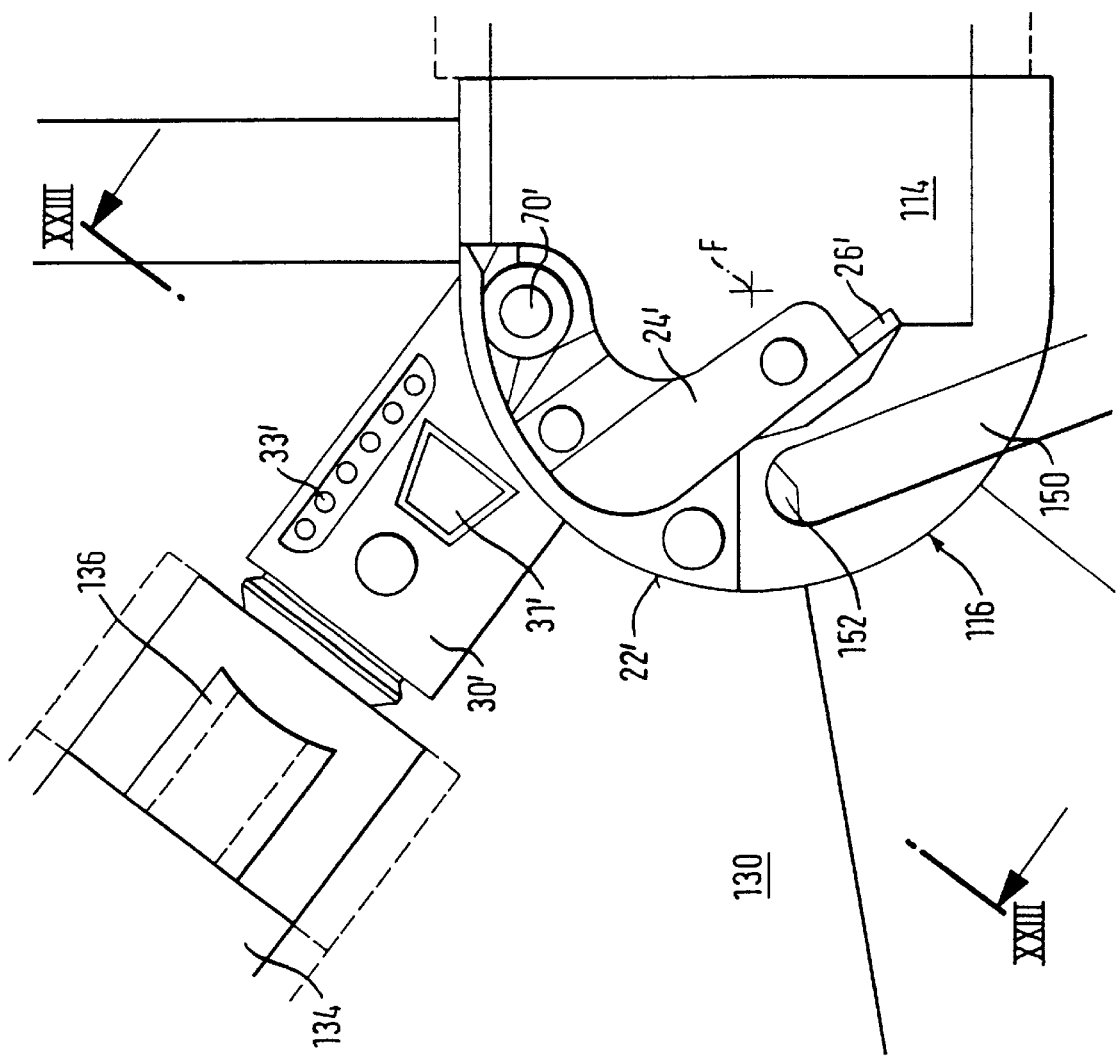
FIG. 22 is a magnified illustration of the detail of the injection mold as shown in FIG. 21

Referring now to FIG. 22 there is illustrated on a magnified scale the appendix mold insert 130 and the support mold insert 114, it being clear from this view that part of the mold joint surface area 116 forms the mold contour 22' for the cylindrical surface area of the support. Likewise clearly evident are the sections of the mold contour 20' for the dished mount 26' and the holes 70' serving to receive the cogs of the sensor lever.

This injection mold permits molding supports for an inertia sensor having a molded appendix in which the appendix is molded at various angles to the cylindrical surface area of the support, this merely requiring the appendix mold insert 130 to be set by shifting it in the recess 112 to the desired angle. With the aid of the pins 136 the insert 130 can be locked in place in the injection mold 110, it not being necessary to swap the inserts 114, 130 for this purpose. However, the insert 130 too is easily replaced, of course, for instance for producing a support having an appendix with a molded plate 56 as described above. Swapping the support mold insert 114 by another insert is likewise possible to advantage, for example, by an insert for a support configured for some other kind of mass body.

Figure 23:
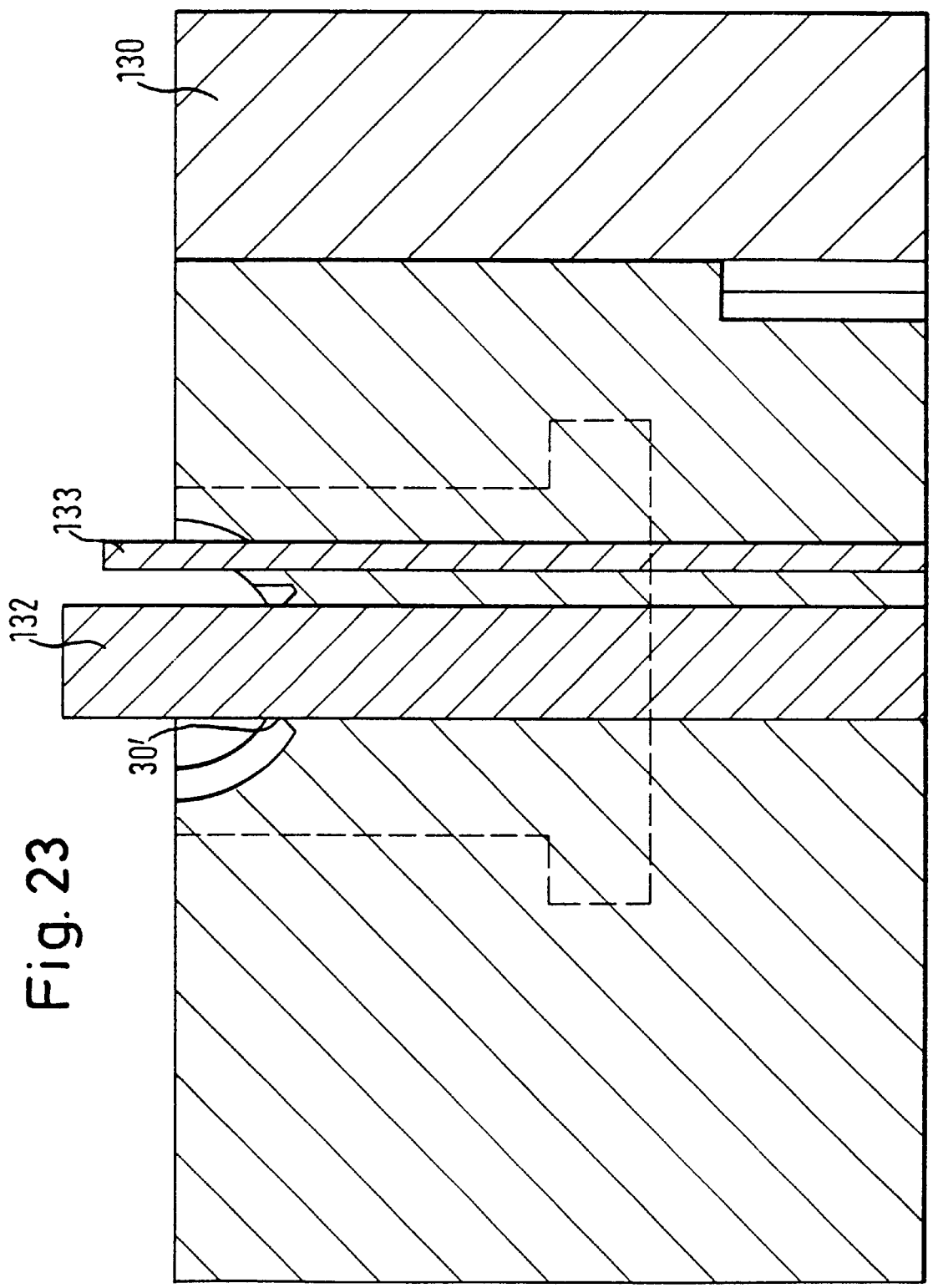
FIG. 23 is a cross-section through the detail as shown in FIG. 22 taken along the line XXIII—XXIII in FIG. 22.

Referring now to FIG. 23 there is illustrated the appendix mold insert 130 in cross-section. The section runs perpendicular to the line XXIII—XXIII as shown in FIG. 22. In this illustration the molding contour 30' for one half of the cylindrical appendix is evident. One insert pin 132 produces in the appendix the hole 31' (FIG. 22), in addition to which further insert pins 133 are provided for coding the angles between the axis of the appendix and the X/Z plane in the finished support. Depending on the angle set between the appendix mold insert 130 and the support mold insert 114 an assigned number of insert pins is employed at the predefined position. The appendix of the finished support then contains a corresponding number of coding marks in the form of coding holes (see also FIG. 22) by means of which it is easy to establish for which mounting position this sensor is suitable. The sensor lever is expediently configured with the same arrangement of coding marks so that it can be assigned to the matching support.

The person skilled in the art will readily appreciate from the above description that such an injection mold may be made available analogously also for producing a sensor lever having a molded control pawl for an inertia sensor in accordance with the invention. Thus with the aid of the invention considerable savings in time and money are possible in producing inertia sensors.

What is claimed is:

1. An inertia sensor for vehicle-sensitive activation of a belt retractor blocking mechanism, said sensor comprising
   a mass body,
   a support for said mass body, and
   a sensor lever with a control pawl,
   said sensor lever being mounted on said support for swivelling motion about a swivel axis and resting on said mass body,
   said control pawl having a free end defining a contact section for contact with a control disc of said belt retractor,
   said support being provided with a first circular cylindrical surface area,
   the axis of said first circular cylindrical surface area being parallel to said swivel axis and running through the center of gravity of said mass body,
   an appendix being formed on said first circular cylindrical surface area of said support for mounting said support to said belt retractor.

2. The inertia sensor as set forth in claim 1, wherein said sensor lever is provided with a second circular cylindrical surface area,
   said axis of said second circular cylindrical surface area being parallel to said swivel axis and running through the center of gravity of said mass body,
   said control pawl being mounted to said second circular cylindrical surface area.

3. The inertia sensor as set forth in claim 1, wherein
   said appendix defines a longitudinal axis,
   said longitudinal axis extending perpendicular to said swivel axis and passing through said contact section of said control pawl when said sensor is in an activating condition.

4. The inertia sensor as set forth in claim 1, wherein
   said sensor lever comprises two cogs each having a tip, each of said cogs comprising at its tip a conical section and, adjoining thereto, a circular cylindrical section,
   said support comprising two holes, each of said holes comprising at the bottom a conical section and, adjoining thereto, a circular cylindrical section,
   said sensor lever being mounted on said support for swivelling motion by means of said cogs engaging into said holes.

5. The inertia sensor as set forth in claim 1, wherein
   said sensor lever comprises a supporting surface area,
   said supporting surface area being circular cylindrical with respect to said swivel axis,
   and wherein said support is provided with ribs having an outer contour, which is cylindrical with respect to said swivel axis,
   said outer contour of said ribs being slightly spaced away from said supporting surface area.

6. The inertia sensor as set forth in claim 1, wherein coding marks are provided on said inertia sensor for determining the position of said appendix with respect to said support.

7. The inertia sensor as set forth in claim 2, wherein coding marks are provided on said inertia sensor for determining the position of said control pawl with respect to said sensor lever.

8. A belt retractor comprising
   a housing with a recess,
   a blocking mechanism with a control disc, an inertia sensor for vehicle-sensitive activation of said blocking mechanism,
   said inertia sensor comprising a mass body, a support for said mass body, and a sensor lever with a control pawl,
   said sensor lever being mounted on said support for swivelling motion about a swivel axis and resting on said mass body,
   said control pawl having a free end defining a contact section for contact with said control disc, said support being provided with a first circular cylindrical surface area,
   the axis of said first circular cylindrical surface area being parallel to said swivel axis and running through the center of gravity of said mass body, an appendix being formed on said first circular cylindrical surface area of said support,
   said appendix having a free end on which a plate is provided and said plate being mounted non-rotatably in said recess.

9. A belt retractor comprising
   a housing with a recess,
   a blocking mechanism with a control disc, an inertia sensor for vehicle-sensitive activation of said blocking mechanism,
   said inertia sensor comprising a mass body, a support for said mass body, and a sensor lever with a control pawl,
   said sensor lever being mounted on said support for swivelling motion about a swivel axis and resting on said mass body,
   said control pawl having a free end defining a contact section for contact with said control disc,
   said support being provided with a first circular cylindrical surface area, the axis of said first circular cylindrical surface area being parallel to said swivel axis and running through the center of gravity of said mass body, an appendix being formed on said first circular cylindrical surface area of said support, said appendix having a longitudinal axis and being of a cylindrical shape with respect to said longitudinal axis, said appendix being mounted in said recess so as to be pivotable about said longitudinal axis.

10. The belt reactor as set forth in claim 9, wherein a setting means is provided to secure a rotational position of said appendix in said housing.

* * * * *